(12) United States Patent
Zhang et al.

(10) Patent No.: US 8,759,468 B2
(45) Date of Patent: Jun. 24, 2014

(54) SILICONE RESIN WITH IMPROVED BARRIER PROPERTIES

(71) Applicant: Henkel (China) Company Limited, Shanghai (CN)

(72) Inventors: Liwei Zhang, Shanghai (CN); Yong Zhang, Shanghai (CN)

(73) Assignee: Henkel (China) Company Limited, Shanghai (CN)

( * ) Notice: Subject to any disclaimer, the term of this patent is extended or adjusted under 35 U.S.C. 154(b) by 0 days.

(21) Appl. No.: 13/795,965

(22) Filed: Mar. 12, 2013

(65) Prior Publication Data

US 2013/0197181 A1 Aug. 1, 2013

Related U.S. Application Data

(63) Continuation of application No. PCT/CN2011/073921, filed on May 11, 2011.

(51) Int. Cl.
*C08G 77/20* (2006.01)
*H01L 23/29* (2006.01)

(52) U.S. Cl.
USPC .......... 528/31; 528/15; 528/32; 438/127

(58) Field of Classification Search
None
See application file for complete search history.

(56) References Cited

U.S. PATENT DOCUMENTS

| | | | |
|---|---|---|---|
| 5,386,007 A | 1/1995 | Herzig et al. | |
| 5,670,686 A | 9/1997 | Cobb et al. | |
| 6,258,913 B1 | 7/2001 | Herzig et al. | |
| 6,806,509 B2 | 10/2004 | Yoshino et al. | |
| 7,615,387 B2 | 11/2009 | Miyoshi | |
| 7,651,887 B2 | 1/2010 | Morita et al. | |
| 7,705,093 B2 | 4/2010 | Kashiwagi et al. | |
| 8,398,947 B2 * | 3/2013 | Yoon et al. | 423/446 |
| 2004/0178509 A1 | 9/2004 | Yoshino et al. | |
| 2006/0081864 A1 | 4/2006 | Nakazawa | |
| 2007/0073026 A1 | 3/2007 | Miyoshi | |

FOREIGN PATENT DOCUMENTS

| | | |
|---|---|---|
| CN | 100363428 | 1/2008 |
| CN | 100481542 | 4/2009 |
| EP | 1424363 | 2/2007 |
| EP | 2032653 | 12/2009 |
| EP | 2061840 | 1/2010 |
| WO | 2004107458 | 12/2004 |
| WO | 2008023537 | 2/2008 |
| WO | 2012058798 | 5/2012 |

OTHER PUBLICATIONS

International Search Report issued in connection with International Patent Application No. PCT/CN2011/073921 mailed Feb. 16, 2012.
Feng S. Y.; Zhang, J.; Li, M. J.; Zhu, Q. Z.; Organosilicon Polymer and Application thereof, P400-401; Chemical Industry Press.

* cited by examiner

*Primary Examiner* — Marc Zimmer
(74) *Attorney, Agent, or Firm* — James E. Piotrowski

(57) ABSTRACT

The moisture and gas barrier properties of an organopolysiloxane having at least two substituents which are able to undergo crosslinking reactions per molecule shall be improved. This is achieved by providing an organopolysiloxane wherein at least 10 mol % of all substituents are represented by formula (1)

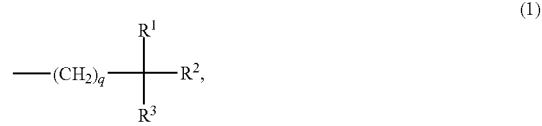

(1)

wherein q is an integer from 0 to 5 and $R^1$, $R^2$, $R^3$ each independently are methyl or ethyl groups.

Furthermore, the invention is directed to a composition based on the aforementioned organopolysiloxane and to the use of the organopolysiloxane and of the composition.

14 Claims, No Drawings

SILICONE RESIN WITH IMPROVED BARRIER PROPERTIES

FIELD OF THE INVENTION

The present invention lies in the field of organopolysiloxanes as they are used e.g. in many applications where prevention of a substrate from moisture is desired. In particular, the invention relates to curable organopolysiloxanes comprising groups which can undergo crosslinking reactions. Specific substituents allowing for improved barrier properties are suggested. Furthermore, the invention relates to the use of such polysiloxanes in encapsulation compositions, e.g. for semiconductor devices. The invention also relates to compositions based on the organopolysiloxanes of the invention and thus having improved barrier properties.

BACKGROUND ART

In the prior art, there is a huge number of documents disclosing various kinds of organopolysiloxanes, which polymers can alternatively be referred to as silicones. Silicone compositions form cured products having a lot of desirable properties like weather and heat resistance, hydrophobicity and rubber-like properties such as hardness and elongation. According to their intended use the sterical structure as well as the substitution pattern of the organopolysiloxanes can be varied. The sterical structure predominantly depends on the presence of and the relation between M, D, T and/or Q units, whereas the substitution pattern determines the curing mechanism and a lot of further properties.

For example, WO 2004/107458 A2 discloses a light emitting device (LED) encapsulating composition, which comprises at least one polyorganosiloxane with an average compositional formula:

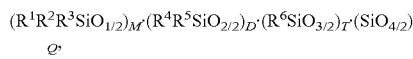

wherein T+Q>0; $R^1$ to $R^6$ are identical or different radicals selected from organic groups, a hydroxyl group and a hydrogen atom; at least one of $R^1$ to $R^6$ is either a hydrocarbon group with a multiple bond or a hydrogen atom, and at least one of $R^1$ to $R^6$ is an aromatic group. The composition can be used for the encapsulation of LEDs which emit light in the blue through UV spectrum.

WO 2004/148812 A1 discloses a curable silicone composition comprising one linear and one branched organopolysiloxane each having alkenyl groups and one organopolysiloxane having silicon hydrogen groups, all polysiloxanes comprising phenyl groups. The composition is characterized by good fillability and curability. A similar organopolysiloxane composition is disclosed in WO 2008/023537 A1. Both compositions exhibit good optical properties.

Further silicone compositions comprising aryl substituents and being curable by hydrosilylation are disclosed in US 20070073026 A1 and US 2004/0178509 A1.

Aryl groups are a good example for demonstrating the dependency of certain properties on the substituents of the organopolysiloxane. On the one hand, aryl groups may enlarge the refractive index of a silicone composition which for many applications may be highly desired. However, the presence of aryl groups in silicone compositions decreases the thermal stability and UV stability of the cured silicone body, which limits its applicability for instance in high power lighting devices like in headlamps of automobiles.

Thus, cured silicone compositions having a normal refractive index advantageously show better thermal stability and UV stability than those having a high refractive index. This might be due to the fact that in such silicones methyl groups are commonly present as organic groups beside reactive groups like alkenyl and Si—H groups. On the other hand, without any aryl groups, such cured silicone compositions show bad barrier properties and corrosive gases and humidity can pass through the sealing material. As a result, substrates might be corrupted and their lifetime may be significantly decreased.

DESCRIPTION OF THE INVENTION

It is therefore an object of the present invention to provide a curable organopolysiloxane having good barrier properties against gases and humidity after curing and simultaneously allowing for a variety of further substitution to determine desired properties and/or curing mechanisms.

Furthermore, improved thermal and UV stability after curing is desired which means that the organopolysiloxane shall not show yellowing or other discoloring effects under the influence of heat and/or UV light.

A first subject matter of the present invention is an organopolysiloxane comprising at least two substituents per molecule which are able to undergo crosslinking reactions, wherein at least 10 mol % of all substituents of the organopolysiloxane are represented by the formula (1)

wherein q is an integer from 0 to 5 and $R^1$, $R^2$ and $R^3$ each independently are methyl or ethyl groups.

The organopolysiloxane according to the present invention can be cured according to the nature of the substituents which are able to undergo curing reactions and will after curing exhibit particularly good barrier properties against gases and moisture. Furthermore, it has good thermal stability and very low discoloration tendency.

An "organopolysiloxane" is understood to be a linear or branched polymer which is substantially composed of silicon atoms linked via oxygen atoms to form a chain or a network and wherein the remaining valencies of the silicon atoms, i.e. the valencies which are not saturated by linking oxygen atoms, are saturated totally or at least predominantly by organic substituents and to a lower extent by hydrogen atoms and/or OH groups.

According to the present invention, the term "organopolysiloxane" also encompasses polymers which to a major extent consist of siloxane repeating units but which to a minor extent may also comprise alkylene, arylene and/or aralkylene bridges between siloxane units. Preferably, however, the skeleton of the organopolysiloxane according to the present invention is exclusively composed of silicon atoms linked via oxygen atoms. This means that the organopolysiloxane does not encompass any of the aforementioned hydrocarbon bridges between siloxane units.

A "substituent" is understood to be an atom or a chemical group being directly bonded to a silicon atom of the polysiloxane skeleton and not contributing to the polymer chain or network before curing. The organopolysiloxane according to the invention comprises at least two substituents per molecule thereof which are able to undergo crosslinking reactions.

These substituents can thus be able to directly react with functional groups of other molecules of low-molecular substances or polymers. The reaction with polymers leads to crosslinking of the organopolysiloxane according to the invention. Such polymers can be of the same type as the organopolysiloxane according to the invention or of a different type. Alternatively, the substituents which are able to undergo crosslinking reactions can be such that they are transformed into an active species which will then be able to react with functional groups of other molecules in the aforementioned sense.

Regarding the at least two substituents per molecule of the organopolysiloxane which are able to undergo crosslinking reactions, the organopolysiloxane of the invention preferably comprises at least two substituents per molecule selected from alkenyl groups and a hydrogen atom. It is thus possible that an organopolysiloxane molecule of the invention comprises at least two alkenyl groups or at least two H-atoms or at least one alkenyl group and at least one H-atom. An alkenyl group is understood to be any hydrocarbon group having an olefinic carbon-carbon double bond. More preferably, the organopolysiloxane of the invention comprises at least two substituents per molecule selected from a vinyl group and an allyl group. Most preferably, the organopolysiloxane of the invention comprises at least two vinyl groups per molecule.

According to the invention, at least 10 mol % of all substituents of the organopolysiloxane are represented by formula (1) as set forth above. The substituents according to formula (1) are not regarded to be "substituents which are able to undergo crosslinking reactions" as they do not comprise any reactive groups. Preferably, at least 15 mol % of all substituents of the organopolysiloxane of the invention is represented by formula (1). More preferably, at least 20 and most preferably at least 25 mol % of all substituents of the organopolysiloxane of the invention are represented by formula (1).

Preferably, q in formula (1) is an integer from 0 to 2. Alkylene chains of the resulting length have been found to contribute to very good barrier properties of the organopolysiloxane of the invention.

Preferably, $R^1$, $R^2$ and $R^3$ in formula (1) are methyl groups.

Preferably, q in formula (1) is an integer from 0 to 2 and $R^1$, $R^2$ and $R^3$ are methyl groups. Thus, the substituents according to formula (1) are preferably selected from tert-butyl, 2,2-dimethyl-n-propyl groups and 3,3-dimethyl-n-butyl groups. Among these, 3,3-dimethyl-n-butyl groups are most preferred ones and formula (1) most preferably represents a 3,3-dimethyl-n-butyl group.

Preferably, the organopolysiloxane according to the present invention comprises at least two vinyl groups per molecule and at least 10 mol %, more preferably at least 15 mol %, still more preferably at least 20 mol % and most preferably at least 25 mol % of all substituents of the organopolysiloxane are 3,3-dimethyl-n-butyl groups.

As set forth above, it is preferred that at least 10 mol % of all substituents of the organopolysiloxane according to the present invention, more preferably at least 15 mol % of all substituents, still more preferably at least 20 mol % of all substituents and most preferably at least 25 mol % of all substituents are 3,3-dimethyl-n-butyl groups. Further substituents at the organopolysiloxane which do not belong to the substituents represented by formula (1) or to the substituents which are able to undergo crosslinking reactions are preferably methyl, ethyl and n-propyl groups. Among these, methyl groups are most preferred.

A further subject matter of the present invention is a curable composition comprising at least one organopolysiloxane according to the present invention. A "curable composition" is understood to be a mixture of two or more substances which mixture can be converted from a soft state into a harder state by means of physical or chemical actions. Those physical or chemical actions can consist, for example, in the delivery of energy in the form of heat, light, or other electromagnetic radiation, but also in simply bringing into contact with atmospheric moisture, water, or a reactive component.

According to the present invention, a curable composition of the heat curing type is preferred because it can be cured within short time.

According to an embodiment of the curable composition of the invention, the curable composition comprises
  (A) at least one organopolysiloxane represented by the average compositional formula (2)

i. $R^4_n SiO_{(4-n)/2}$  (2), wherein $R^4$ represents identical or different organic groups selected from methyl, ethyl, n-propyl, vinyl, allyl and any group represented by formula (1)

wherein q is an integer from 0 to 5 and $R^1$, $R^2$, $R^3$ each independently are methyl or ethyl groups; at least 10 mol % of $R^4$ are identical or different groups represented by formula (1), at least two of $R^4$ per molecule each independently are vinyl or allyl, and n is a positive number satisfying $1 \leq n < 2$;
  (B) at least one organohydrogenpolysiloxane represented by the average compositional formula (3)

ii. $R^5_m H_p SiO_{(4-m-p)/2}$  (3), wherein $R^5$ represents identical or different groups selected from methyl, ethyl, n-propyl and any group represented by formula (1)

wherein q is an integer from 0 to 5 and $R^1$, $R^2$, $R^3$ each independently are methyl or ethyl groups; m is a positive number satisfying $1 \leq m < 2$, and p is a positive number satisfying $0.001 < p < 1$; with the proviso that at least two Si—H groups are comprised per molecule;
  (C) a catalytic amount of addition reaction catalyst;
wherein the molar ratio of hydrogen atoms directly bonded to a silicon atom in component (B) to the sum of vinyl and allyl groups of component (A) is 0.5 to 10.

The curable composition according to the present invention cures into a transparent product having good thermal and UV resistance and particularly good barrier properties. The vinyl and/or allyl groups of the organopolysiloxane of component (A) and the Si—H groups of the organohydrogenpolysiloxane of component (B) advantageously offer functional groups for addition curing of the silicone composition according to the present invention.

The silicone resin of component (A) substantially is a liquid or solid organopolysiloxane of branched or three-dimensional network structure represented by the average compositional formula (2) as set forth above. Preferably, $R^4$ represents identical or different organic groups selected from methyl, vinyl and any group represented by formula (1), and at least two of $R^4$ per molecule are vinyl groups.

Regarding the groups represented by formula (1), $R^1$, $R^2$ and $R^3$ preferably are methyl groups. Furthermore, q is preferably an integer from 0 to 2. More preferably, $R^1$, $R^2$ and $R^3$ are methyl groups and q is an integer from 0 to 2. Most preferably, the group represented by formula (1) is a 3,3-dimethyl-n-butyl group.

Thus, $R^4$ more preferably represents identical or different organic groups selected from methyl, vinyl and any group represented by formula (1), wherein $R^1$, $R^2$ and $R^3$ are methyl groups and/or q is an integer from 0 to 2; at least 10 mol % of $R^4$ are identical or different groups represented by formula (1); and at least two of $R^4$ per molecule are vinyl groups. Most preferably, $R^4$ represents identical or different organic groups selected from methyl, vinyl and 3,3-dimethyl-n-butyl groups; at least 10 mol % of $R^4$ are 3,3-dimethyl-n-butyl groups; and at least two of $R^4$ per molecule of the organopoplysiloxane are vinyl groups.

The content of groups represented by formula (1) has proven to be an important feature of the composition according to the present invention with respect to the barrier properties. Thus, preferably at least 15 mol %, more preferably at least 20 mol % and most preferably at least 25 mol % of $R^4$ are identical or different groups represented by formula (1).

Component (B) of the curable composition according to the present invention is an organohydrogenpolysiloxane, which substantially serves as a crosslinking agent by undergoing a hydrosilylation reaction with the vinyl and/or allyl containing silicone resin (A). Component (B) is an organohydrogenpolysiloxane having at least two, preferably at least three Si—H bonds in a molecule thereof and is represented by the average compositional formula (3) as set forth above. An "organohydrogenpolysiloxane" is understood to comprise at least four units according to formula (3).

Regarding the groups represented by formula (1) within the organohydrogenpolysiloxane according to compositional formula (3), the same preferences as in compositional formula (2) apply. Thus, $R^1$, $R^2$ and $R^3$ preferably are methyl groups. Furthermore, q is preferably an integer from 0 to 2. More preferably, $R^1$, $R^2$ and $R^3$ are methyl groups and q is an integer from 0 to 2. Most preferably, the group represented by formula (1) is a 3,3-dimethyl-n-butyl group.

Preferably, at least 5 mol % of $R^5$ is selected from ethyl, n-propyl and any group represented by formula (1). More preferably, at least 5 mol % of $R^5$ is selected from ethyl, n-propyl and any group represented by formula (1), wherein q is an integer from 0 to 2 and $R^1$, $R^2$ and $R^3$ are methyl groups, and 1<m+p<2.4. Most preferably, at least 5 mol % of $R^5$ is selected from ethyl, n-propyl and 3,3-dimethyl-n-butyl groups, and 1<m+p<2.4.

Furthermore, groups represented by formula (1) preferably represent 5-50 mol %, more preferably 8 to 40 mol % and most preferably 10-30 mol % of all substituents at the silicon atoms of the organohydrogenpolysiloxanes according to compositional formula (3). That means, groups represented by formula (1) represent 5-50 mol %, more preferably 8 to 40 mol % and most preferably 10-30 mol % of the sum of $R^5$ groups and hydrogen atoms of the organohydrogenpolysiloxanes represented by compositional formula (3). These amounts of the aforementioned groups have been proven to optimize the barrier properties of the curable composition according to the invention.

Typical examples of the organohydrogenpolysiloxane (B) are:
1,3,5,7-tetramethyl-1'-(3,3-dimethylbutyl)-cyclotetrasiloxane,
1,3,5,7-tetramethyl-1',3'-di(3,3-dimethylbutyl)-cyclotetrasiloxane,
1,3,5,7-tetramethyl-1',5'-di(3,3-dimethylbutyl)-cyclotetrasiloxane,
both ends trimethylsiloxy-capped methyl(3,3-dimethylbutyl) siloxane-dimethylsiloxane-methylhydrogensiloxane copolymers,
both ends trimethylsiloxy-capped methyl(3,3-dimethylbutyl) siloxane-methylhydrogensiloxane copolymers,
both ends dimethyl(3,3-dimethylbutyl)siloxy-capped methyl (3,3-dimethylbutyl)siloxane-dimethylsiloxane-methylhydrogensiloxane copolymers,
both ends dimethyl(3,3-dimethylbutyl)siloxy-capped methyl (3,3-dimethylbutyl) siloxane-methylhydrogensiloxane copolymers,
both ends dimethylhydrogensiloxy-capped methyl(3,3-dimethylbutyl)siloxane-dimethylsiloxane-methylhydrogensiloxane copolymers,
both ends dimethylhydrogensiloxy-capped methyl(3,3-dimethylbutyl)siloxane-methylhydrogensiloxane copolymers,
copolymers consisting of $(CH_3)_2HSiO_{1/2}$ units and (3,3-dimethylbutyl)$SiO_{3/2}$ units,
copolymers consisting of $(CH_3)_2HSiO_{1/2}$ units and (2,2-dimethylpropyl)$SiO_{3/2}$ units,
copolymers consisting of $(CH_3)_2HSiO_{1/2}$ units and (tert-butyl)$SiO_{3/2}$ units,
copolymers consisting of $(CH_3)_2HSiO_{1/2}$ units, (3,3-dimethylbutyl)$SiO_{3/2}$ units and $SiO_{4/2}$ units,
copolymers consisting of $(CH_3)_2HSiO_{1/2}$ units, (2,2-dimethylpropyl)$SiO_{3/2}$ units and $SiO_{4/2}$ units,
copolymers consisting of $(CH_3)_2HSiO_{1/2}$ units, (tert-butyl) $SiO_{3/2}$ units and $SiO_{4/2}$ units.

In these examples, "3,3-dimethylpropyl" and "3,3-dimethylbutyl" are understood to be 3,3-dimethyl-n-propyl and 3,3-dimethyl-n-butyl, respectively.

The amounts of component (A) and component (B) preferably are such that the molar ratio of silicon-bonded hydrogen atoms (i.e., SiH groups) of component (B) to the sum of silicon-bonded vinyl and allyl groups in the organopolysiloxanes of component (A) is in the range of 0.5 to 10, more preferably of 0.8 to 4, and most preferably of 1 to 3.

Component (C) is an addition reaction catalyst for promoting the hydrosilylation addition reaction between vinyl and/or allyl groups in component (A) and Si—H groups in component (B). Typical addition reaction catalysts are platinum group metal catalysts including platinum catalysts such as the reaction products of chloroplatinic acid with monohydric alcohols, complexes of chloroplatinic acid with olefins, and platinum bisacetoacetate, palladium catalysts and rhodium catalysts. The addition reaction catalyst preferably is used in a catalytic amount, more preferably in such an amount to give about 1 to 100 ppm, especially about 2 to 20 ppm of metal, especially of platinum group metal, based on the weight of components (A) and (B) combined. The term "metal" or "platinum group metal", respectively, only refers to the content of the metal itself, even if in the curable composition of the present invention the metal exists as a complex compound.

In addition to the components (A) to (C) described above, the composition according to the present invention may further comprise optional components insofar as the objects of the invention are not compromised. Possible optional components include addition reaction inhibitors for adjusting curing time and imparting a pot life, and adhesion promoters, for example 3,4-epoxycyclohexylethyl trimethoxysilane, to improve the adhesive properties of the composition.

Insofar as transparency is not impaired, there may be blended inorganic fillers such as fumed silica for enhancing the strength of the composition. If desired, phosphor and antidegradants may also be blended.

The curing conditions typically involve heating at 50 to 200° C. and particularly at 70 to 160° C., for 1 to 60 minutes and particularly for 2 to 30 minutes. Furthermore, post-curing may also be conducted at 50 to 200° C. and particularly at 70 to 160° C., for 0.1 to 10 hours and particularly for 1 to 4 hours.

A further subject matter of the present invention is the use of an organopolysiloxane according to the invention in encapsulation, sealing, protection, bonding and/or lens formation materials. The organopolysiloxane of the invention can provide enhanced barrier properties against moisture and gases. In particular, the organopolysiloxane according to the invention is advantageously used in encapsulation materials for the encapsulation of semiconductor devices, especially of light emitting devices (LEDs).

A further subject matter of the present invention is the use of a curable composition according to the present invention as encapsulation, protection, bonding and/or lens formation material in semiconductor devices.

EXAMPLES

In the following examples, weight average molecular weight values are polystyrene-equivalent values measured using gel permeation chromatography (GPC). Vinyl content was titrated by Chinese Chemical Industry Standard HG/T 3312-2000. Hydrogen content was titrated by following literature (Feng S. Y.; Zhang, J.; Li, M. J.; Zhu, Q. Z.; Organosilicon Polymer and Application Thereof, P400-401; Chemical Industry Press). Hardness was measured with a LX-A Shore durometer. Transmittance was measured by an Evolution 600 UV-Vis spectrometer. Permeation was measured by Mocon Permatran-W® model 3/33 at 50° C./100% RH.

DMB represents a 3,3-dimethyl-n-butyl group, Me represents a methyl group, Vi represents a vinyl group, TMS represents a trimethoxysilyl group.

Raw materials: XS-60056-HSR (organohydrogenpolysiloxane) was prepared following the patent application PCT/CN2010/078329 filed by Henkel China Co. Ltd; 3,3-dimethylbutyltrimethoxysilane (DMBTMS) was prepared in lab by the process described in synthetic example 1; 3,3-dimethylbutyltriethoxysilane (DMBTES) was obtained from Gelest, Inc.; vinyl trimethoxysilane (VTMS), dimethyldimethoxysilane (MDMS), hexamethyldisilazane (HMDZ), acetic acid (HAc) and other reagents were obtained from Sinopharm Chemical Reagent Co., Ltd.

Synthetic Example 1

2,2-dimethylbutylene (16.8 g), trimethoxysilane (30.0 g) and tris-(triphenylphosphine) ruthenium (II) dichloride (50 mg) were dissolved in THF (80 g), followed by stirring at 70° C. for 7 hours. Then low boiling components were removed by rotary evaporation and DMBTMS was distilled out under reduced pressure. A colorless transparent liquid (28 g) was obtained. $^1$H NMR: C$\underline{H}_3$O—(s, 3.534-3.608 ppm), —C$\underline{H}_2$CH$_2$Si (t, 1.268-1.345 ppm), C$\underline{H}_3$—(s, 0.931-0.982 ppm), —CH$_2$C$\underline{H}_2$Si (t, 0.458-0.587 ppm).

Synthetic Example 2

DMBTMS (69.90 g), VTMS (16.78 g), MDMS (13.63 g), toluene (224 ml) and HCl aqueous (84 ml, 1 mol/l) were weighed out and charged into a round bottom flask. After it was stirred and refluxed at 110° C. for 5 hours, the mixture was transferred into a separation funnel. The toluene phase was washed with distilled water until neutral, followed by drying with MgSO$_4$. The solution was transferred into a flask and stirred at room temperature. Then HMDZ (78.01 g) and HAc (7.80 g) were added sequentially. Later the solution was heated to 50° C. and stirred for 5 hours, followed by washing with distilled water until neutral and drying with MgSO$_4$. After that the solvent was removed by rotary evaporation and a high viscous liquid was obtained: average molecular weight of 1700, vinyl content of 1.1 mmol/g.

Synthetic Example 3

DMBTES (49.95 g), VTMS (7.48 g), toluene (127 ml) and HCl aqueous (40 ml, 1 mol/l) were weighed out and charged into a round bottom flask. After it was stirred and refluxed at 110° C. for 5 hours, the mixture was transferred into a separation funnel. The toluene phase was washed with distilled water until neutral, followed by drying with MgSO$_4$. The solution was condensed to around 100 ml, followed by adding HMDZ (5.25 g) and HAc (0.54 g) sequentially. Later the solution was heated to 50° C. and stirred for 5 hours, followed by washing with distilled water until neutral and drying with MgSO$_4$. After that the solvent was removed by rotary evaporation and a high viscous liquid was obtained: average molecular weight of 1680, vinyl content of 1.4 mmol/g.

Synthetic Example 4

XS-60056-HSR (25.77 g), 3,3-dimethylbutylene (12.77 g), toluene (25.77 ml) and Pt@Al$_2$O$_3$ (0.29 g, 0.5% Pt) were weighed out and charged into a Teflon column in a stainless steel jacket. The mixture was stirred at 90° C. for 1.5 hours before filtration to remove the Pt@Al$_2$O$_3$ particles. Then the solution was purified by rotary evaporation to get a highly viscous liquid: silicon-hydrogen content of 3.3 mmol/g.

Synthetic Example 5

DMBTES (12.48 g), dimethylchlorosilane (5.33 g) and toluene (20 ml) were weighed out and charged into a round bottom flask. Distilled water (10.8 g) was added at room temperature. Then the mixture was heated to 100° C. and stirred for 2 hours. After being transferred into a separation funnel, the water phase was removed and the toluene phase was washed with distilled water until neutral, followed by drying with MgSO$_4$. A colorless liquid was obtained after removing the solvent: silicon-hydrogen content of 4.4 mmol/g.

Application Example 1

According to the Invention 3.70 g product of synthetic example 2, 1.63 g product of synthetic example 4 and one drop Pt catalyst were mixed together and then heated at 150° C. for 2 hours.

Application Example 2

According to the Invention 2.40 g product of synthetic example 3, 0.98 g product of synthetic example 5 and one drop Pt catalyst were mixed together, and then heated at 120° C. for 1 hour and 150° C. for 1 hours.

Comparative Example 1

Dow corning high RI material OE6631, A and B component were mixed at a ratio of A:B=1:2 and heated at 70° C. for 1 hour, 120° C. for 1 hour and 150° C. for 1 hour.

Comparative Example 2

3.01 g XS-60056-HSR and 1.02 g $D_4^{vi}$ and one drop Pt catalyst were mixed together, and then heated at 150° C. for 2 hours.

| Item | Application example 1 | Application example 2 | Comparative example 1 | Comparative example 2 |
|---|---|---|---|---|
| Hardness (Shore A) | 90 | 87 | 90 | 95 |
| Permeation (g · mil/100 inch$^2$ · day) | 80 | 78 | 83 | 202 |
| T@400 nm (initial) | 93.6% | 94.5% | 93.0% | 92.6% |
| T@400 nm (150° C., 1000 hours) | 93.1% | 93.6% | 86.5% | 92.2% |
| T@400 nm (UV-313B, 1000 hours) | 93.2% | 93.7% | 88.6% | 92.6% |

A further study was carried out as a model process:
1) $R^9Si(OCH_3)_3$ (0.1 mol) and dimethyldimethoxysilane (0.1 mol) were dissolved in toluene (70 ml) and HCl aqueous (0.1 mol/L, 35 ml) was added, followed by stirring and refluxing at 110° C. for 5 hours;
2) after phase separation, the toluene phase was washed with distilled water until neutral and dried with $MgSO_4$, followed by rotary evaporation to remove toluene;
3) a colorless liquid was obtained which was put into an oven and kept at 150° C. for 72 hours;
4) a solid was obtained.

$R^9$ was 3,3-dimethyl-n-butyl, n-hexyl, cyclohexyl, n-octyl, n-nonyl and n-decyl, respectively. When $R^9$ was 3,3-dimethyl-n-butyl, the final solid was colorless transparent while the others were yellow to brown. Consequently, the other substituents were proved to have worse anti-yellowing properties than 3,3-dimethyl-n-butyl.

What is claimed:

1. An organopolysiloxane comprising at least two substituents per molecule which are able to undergo crosslinking reactions, wherein at least 10 mol % of all substituents of the organopolysiloxane are represented by the formula (1)

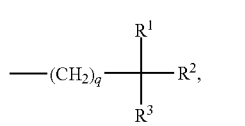

(1)

wherein q is an integer from 0 to 5 and $R^1$, $R^2$ and $R^3$ each independently are methyl or ethyl groups.

2. The organopolysiloxane according to claim 1, wherein at least 15 mol % of all substituents are represented by formula (1).

3. The organopolysiloxane according to claim 1, wherein at least 20 mol % of all substituents are represented by formula (1).

4. The organopolysiloxane according to claim 1, wherein q is an integer from 0 to 2.

5. The organopolysiloxane according to claim 1, wherein $R^1$, $R^2$ and $R^3$ are methyl groups.

6. The organopolysiloxane according to claim 1, wherein q is an integer from 0 to 2 and $R^2$, $R^2$ and $R^3$ are methyl groups.

7. The organopolysiloxane according to claim 1, wherein formula (1) represents a 3,3-dimethyl-n-butyl group.

8. The organopolysiloxane according to claim 1, wherein the organopolysiloxane comprises at least two substituents per molecule selected from alkenyl groups and a hydrogen atom.

9. The organopolysiloxane according to claim 1, wherein the organopolysiloxane comprises at least two vinyl groups per molecule.

10. The organopolysiloxane according to claim 1, wherein the organopolysiloxane comprises at least two vinyl groups per molecule and at least 10 mol % of all substituents of the organopolysiloxane are 3,3-dimethyl-n-butyl groups.

11. A curable composition comprising at least one organopolysiloxane according to claim 1.

12. A curable composition according to claim 11, comprising
(A) at least one organopolysiloxane represented by the average compositional formula (2)

(2), wherein $R^4$ represents identical or different organic groups selected from methyl, ethyl, n-propyl, vinyl, allyl and any group represented by formula (1)

(1)

wherein q is an integer from 0 to 5 and $R^1$, $R^2$, $R^3$ each independently are methyl or ethyl groups; at least 10 mol % of $R^4$ are identical or different groups represented by formula (1), at least two of $R^4$ per molecule each independently are vinyl or allyl, and n is a positive number satisfying $1 \leq n < 2$;

(B) at least one organohydrogenpolysiloxane represented by the average compositional formula (3)

(3), wherein $R^5$ represents identical or different groups selected from methyl, ethyl, n-propyl and any group represented by formula (1)

(1)

wherein q is an integer from 0 to 5 and $R^1$, $R^2$, $R^3$ each independently are methyl or ethyl groups; m is a positive number satisfying $1 \leq m < 2$, and p is a positive number satisfying $0.001 < p < 1$; with the proviso that at least two Si—H groups are comprised per molecule;

(C) a catalytic amount of addition reaction catalyst;

wherein the molar ratio of hydrogen atoms directly bonded to a silicon atom in component (B) to the sum of vinyl and allyl groups of component (A) is 0.5 to 10.

13. A process of using an organopolysiloxane according to claim 1 in encapsulation, sealing, protection, bonding and/or lens formation materials, the process comprising providing said organopolysiloxane in an amount sufficient to be used in said encapsulation, sealing, protection, bonding and/or lens formation materials.

14. A process of using the curable composition according to claim 12 as an encapsulation, a protection, a bonding and/or a lens formation material in semiconductor devices, the process comprising providing said curable composition in an amount sufficient to be used in said encapsulation, sealing, protection, bonding and/or lens formation material in semiconductor devices.

* * * * *